United States Patent [19]

Nomoto

[11] Patent Number: 5,523,992
[45] Date of Patent: Jun. 4, 1996

[54] OPTICAL DISK REPRODUCING APPARATUS FOR READING A TRACK BY IRRADIATING TWO TRACKS WITH SINGLE BEAM SPOT

[75] Inventor: Takayuki Nomoto, Tokorozawa, Japan

[73] Assignee: Pioneer Electronic Corporation, Tokyo, Japan

[21] Appl. No.: 295,485

[22] Filed: Aug. 25, 1994

Related U.S. Application Data

[63] Continuation of Ser. No. 956,969, Oct. 6, 1992, abandoned.

[30] Foreign Application Priority Data

Jan. 20, 1992 [JP] Japan ................................. 4-007838

[51] Int. Cl.$^6$ ........................................ G11B 7/00
[52] U.S. Cl. ............................... 369/109; 369/100
[58] Field of Search ......................... 369/109, 44.37, 369/44.38, 44.27, 100, 112, 124, 54, 58, 111, 44.41

[56] References Cited

U.S. PATENT DOCUMENTS

| | | |
|---|---|---|
| 4,310,916 | 1/1982 | Dil ........................................ 369/109 |
| 4,325,135 | 4/1982 | Dil et al. ................................ 369/109 |
| 4,455,632 | 6/1984 | Braat . | |
| 4,674,070 | 6/1987 | Tajima et al. ......................... 369/109 |
| 5,060,214 | 10/1991 | Nakayama et al. . | |
| 5,247,504 | 9/1993 | Akatsuka ....................... 369/44.27 X |

FOREIGN PATENT DOCUMENTS

| | | |
|---|---|---|
| 0376626 | 7/1990 | European Pat. Off. . |
| 57-064336 | 4/1982 | Japan ..................................... 369/109 |
| 3-104021 | 5/1991 | Japan ..................................... 369/109 |

*Primary Examiner*—Georgia Y. Epps
*Assistant Examiner*—P. W. Huber
*Attorney, Agent, or Firm*—Sughrue, Mion, Zinn, Macpeak & Seas

[57] ABSTRACT

An optical disk is provided, on which a light spot is formed by projecting a light beam to optically reproduce information recorded on the optical disk by receiving a light from the light spot by use of a photodetector having two divided light receiving surfaces. The optical disk includes: a disk-shaped information recording member having an information recording surface; a track formed on the information recording surface, disposed along a circular direction of the optical disk, and having track pitch smaller than the diameter of the light spot; and a plurality of pits arranged on the track and modulated by the information recorded on the information recording surface. The pits have parameters determined as functions of the wavelength, the numerical aperture, and the track pitch such that the light from the light spot covering two adjacent turns of the track is detected to be a DC component signal by one of the two divided light receiving surfaces of the photodetector.

5 Claims, 11 Drawing Sheets

| CASE | PIT CROSS SECTION IN DISK RADIAL DERECTION (1 SCALE=0.1μm) | OPTIMAL PIT HEIGHT | OPTIMUM OPTICAL PIT HEIGHT |
|---|---|---|---|
| 1 |  | 0.074 | 0.147 |
| 2 |  | 0.076 | 0.151 |
| 3 |  | 0.079 | 0.157 |
| 4 |  | 0.070 | 0.139 |
| 5 |  | 0.073 | 0.145 |
| 6 |  | 0.076 | 0.151 |
| 7 |  | 0.066 | 0.131 |
| 8 |  | 0.070 | 0.139 |
| 9 |  | 0.073 | 0.145 |

OPTICAL DISK REPRODUCING APPARATUS FOR READING A TRACK BY IRRADIATING TWO TRACKS WITH SINGLE BEAM SPOT

This is a continuation of application Ser. No. 07/956,969 filed Oct. 6, 1992, now abandoned.

BACKGROUND OF THE INVENTION

1. Field of the Invention

The present invention relates to an optical disk and an optical disk reproducing apparatus.

2. Description of the Related Art

Figure 1:
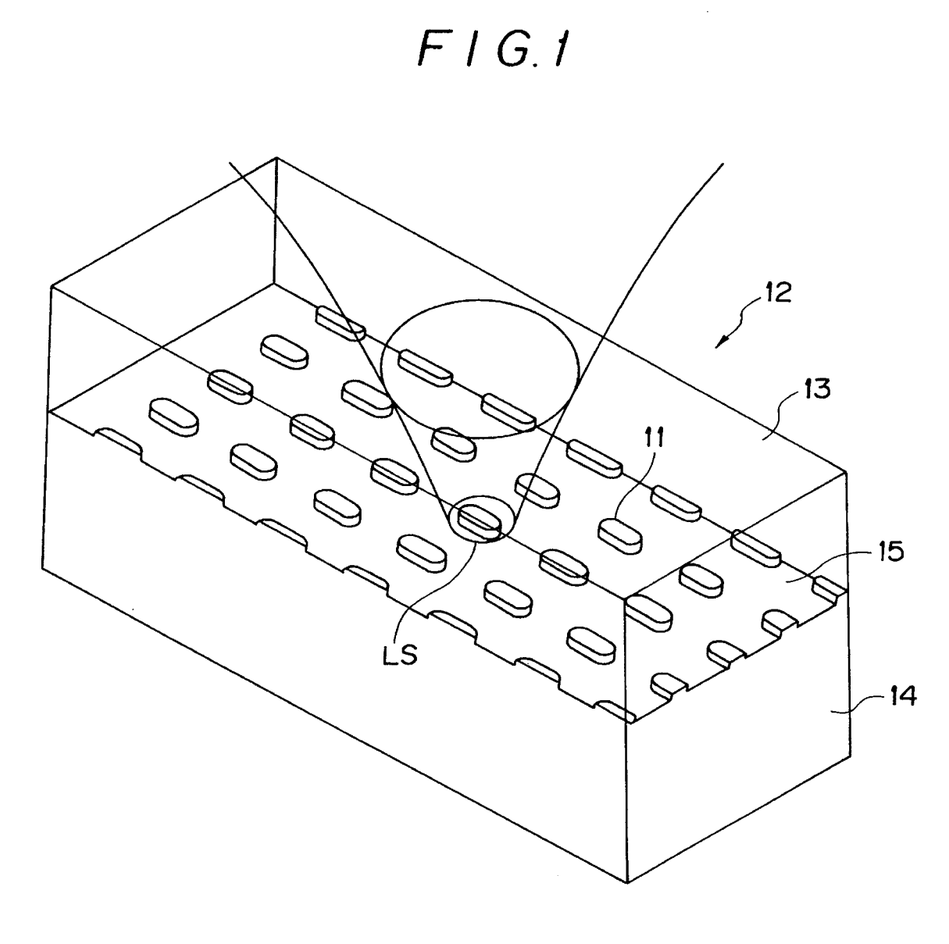
FIG. 1 is a perspective view of a part of an optical disk in the related art.

FIG. 1 shows a part of an optical disk 12. The optical disk 12 includes a substrate 13 having an information recording surface 15 and containing polycarbonate resin, and a protection layer 14 covering the information recording surface 15. A plurality of information pits 11, which have lengths modulated by recording information are recorded on the information recording surface 15. During an information reproducing operation, a laser beam is projected onto one of the information pits 11 so that a laser beam spot LS having a predetermined diameter is formed on the information recording surface 15. A diffracted and reflected light is detected by a photodetector formed with, for example, a photodiode. The photodetector converts the received light into an electric signal. Information, such as audio information and video information, is extracted from the electric signal by means of a signal conversion process, which is the reverse of a signal conversion process for information recording. Examples of optical disks as described above are compact disks (CD) and laser video disks (LVD).

Figure 2:
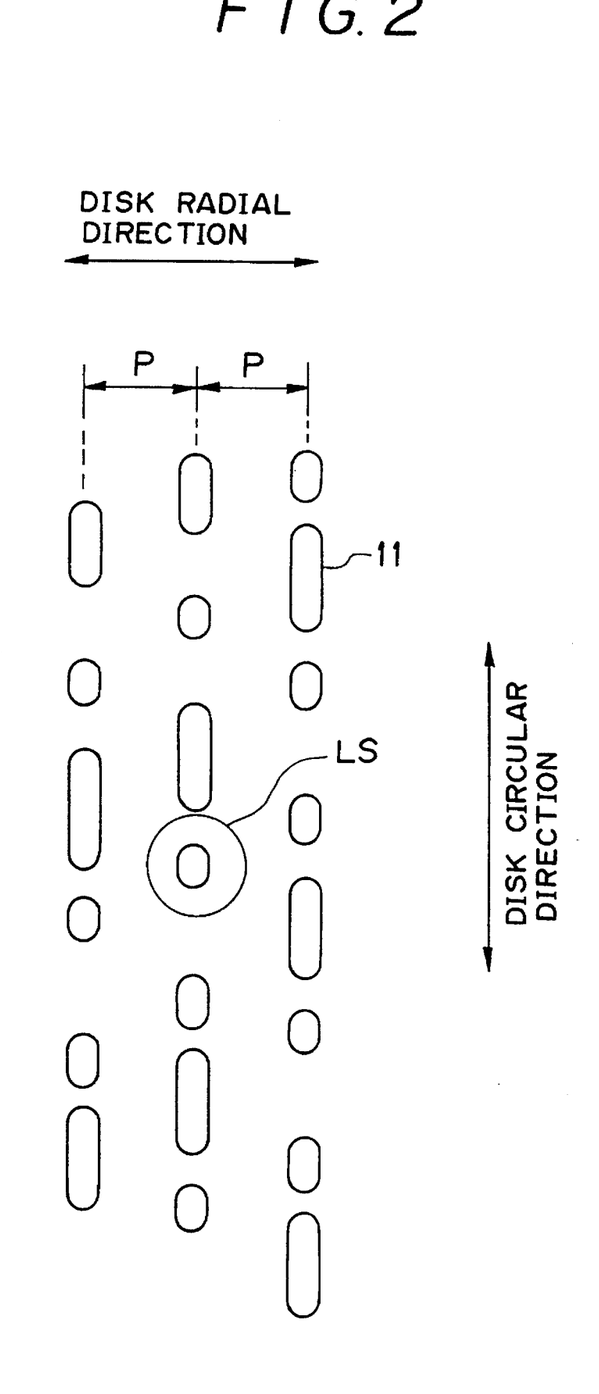
FIG. 2 is a diagram showing a track pitch which is the distance between adjacent tracks formed on the optical disk of FIG. 1.

As shown in FIG. 2, an information recording density of optical disks Greatly depends on the value of a track pitch P and the diameter of the laser beam spot LS formed on the information pit 11. The track pitch P is the distance between the center lines of adjacent pit strings, that is, the distance between the tracks. Hence, in order to increase the information recording density, it may be effective to reduce the track pitch P.

Figure 3:
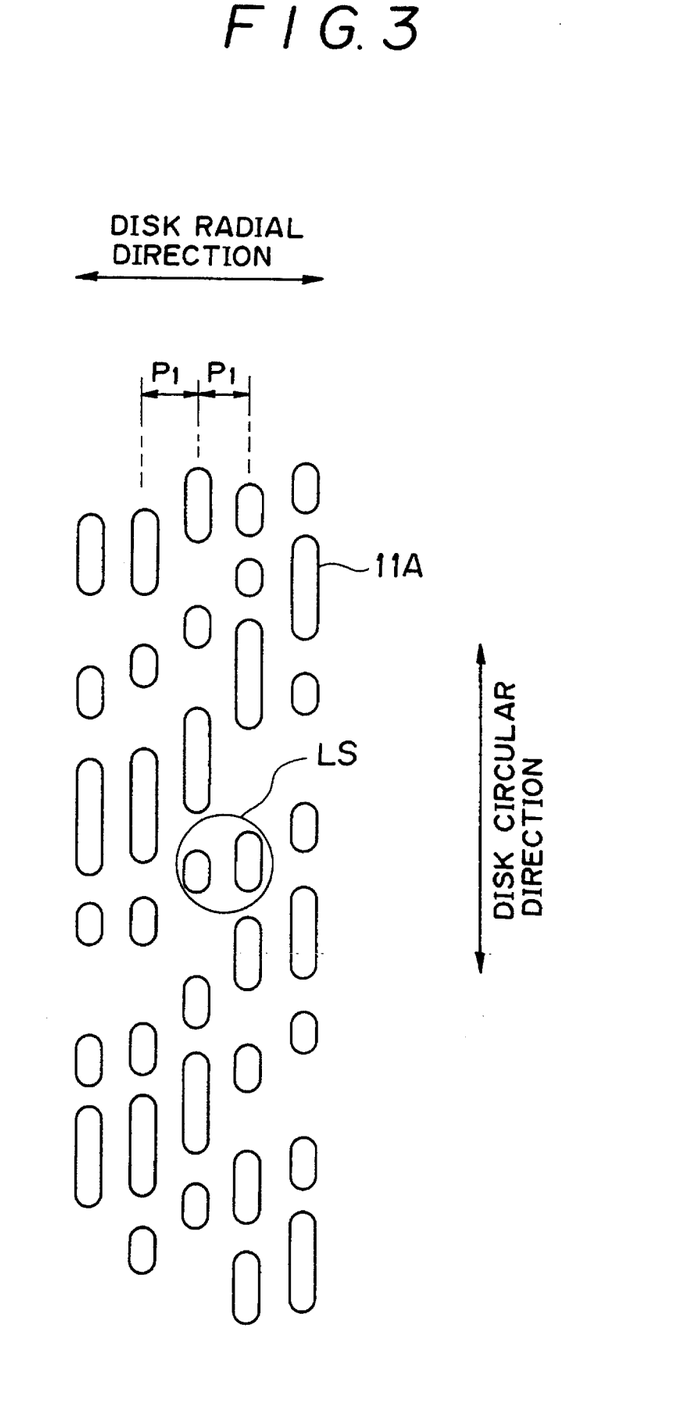
FIG. 3 is a diagram showing an optical disk on which the track pitch is reduced to half of the track pitch shown in FIG. 2.

In the cases as shown in FIGS. 1 and 2, there is no problem of crosstalk between adjacent tracks. However, according to the study of the present inventor, as shown in FIG. 3, if the track pitch is reduced to be a value P1 smaller than the value P shown in FIG.2, for example, P1=P/2, information pits 11A on two adjacent tracks are simultaneously included within the laser beam spot LS. In this case, a large quantity of crosstalk occurs between the adjacent tracks, and the optical disk shown in FIG. 3 is not suitable for practical use.

Figure 4:
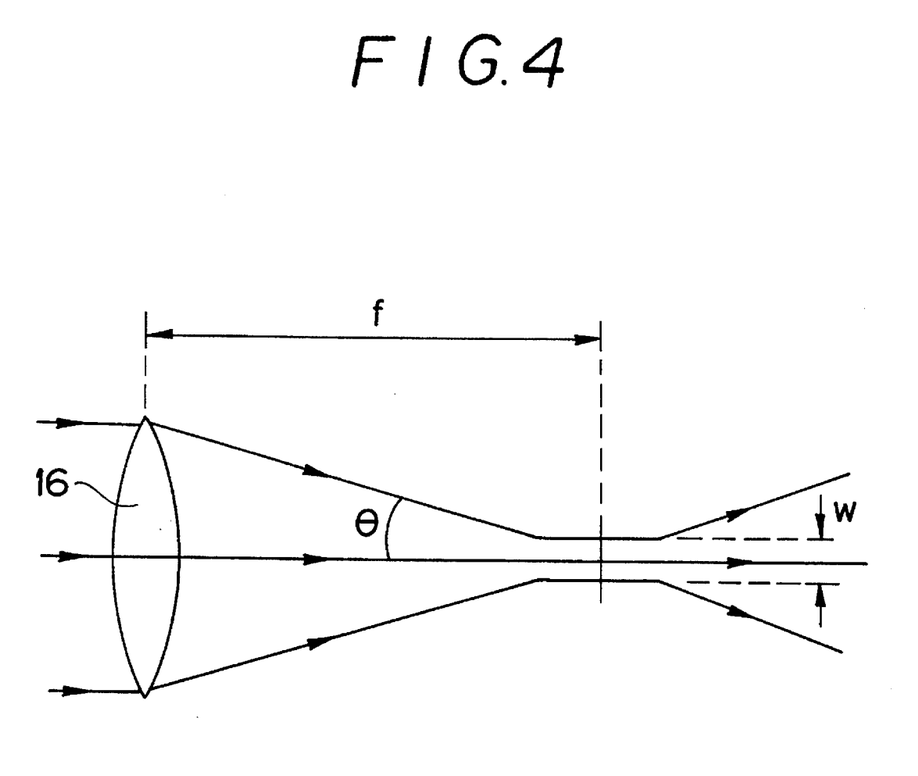
FIG. 4 is a diagram showing a relationship between an objective lens and a laser beam spot.

In order to increase the information recording density, it may be effective to diminish the size of the laser beam spot LS. As shown in FIG. 4, a minimum beam diameter w obtained by focusing, by means of an objective lens 16, a laser beam having a wavelength $\lambda$ at a position corresponding to a focusing distance f of the objective lens 16 is expressed as follows:

$$w = 1.22 \times (\lambda/NA) \tag{1}$$

where NA denotes a numerical aperture of the objective lens 16. The numerical aperture NA is defined as follows:

$$NA = n \times \sin\Theta \tag{2}$$

where n denotes the refractive index of the objective lens 16, and $\Theta$ is the angle of emergence from the objective lens 16. Hence, in order to reduce the diameter w of the laser beam spot LS, it is necessary to reduce either the wavelength $\lambda$ or the numerical aperture NA. The wavelength of a semiconductor laser used for optical disks is approximately equal to 0.780 μm (the μm is equal to $1 \times 10^{-6}$m). The numerical aperture NA for optical disks is approximately equal to 0.45. Hence, the diameter w of the laser beam spot LS is approximated as follows:

$$w_{min} = 1.22 \times (0.780/0.45) = 2.1 \text{ (μm)} \tag{3}$$

As a result, a minimum track pitch which does not result in crosstalk when the laser beam spot LS is projected onto a pit string is approximately equal to 1.6 μm. Thus, optical disks employ a minimum track pitch of 1.6 μm.

SUMMARY OF THE INVENTION

It is therefore an object of the present invention to provide an optical disk and an optical disk reproducing apparatus, which can employ a reduced track pitch while effectively avoiding the crosstalk of adjacent tracks.

According to the present invention, the above object can be achieved by an optical disk, on which a light spot is formed by projecting a light beam having a predetermined wavelength to optically reproduce information recorded on the optical disk by receiving a light from the light spot under a condition of a predetermined numerical aperture by use of a photodetector having two divided light receiving surfaces. The optical disk includes: a disk-shaped information recording member having an information recording surface; a track formed on the information recording surface, disposed along a circular direction of the optical disk, and having track pitch smaller than the diameter of the light spot; and a plurality of pits arranged on the track and modulated by the information recorded on the information recording surface. The pits have parameters determined as functions of the wavelength, the numerical aperture, and the track pitch such that the light from the light spot covering two adjacent turns of the track is detected to be a DC component signal by one of the two divided light receiving surfaces of the photodetector.

In the present invention, the information recorded on the optical disk is read by projecting the light beam, such as a laser beam. Then, by receiving the light from the light spot, such as a diffraction and reflection light, or transmitted light from the light spot, the reproducing operation is enabled. In the present invention, a plurality of turns of the track are spirally or coaxially formed, on the information recording surface. Adjacent turns of the track, are spaced apart from each other with the predetermined track pitch. On the track, there are formed a plurality of information pits each having the predetermined parameters, such as a pit length, a pit width and an optical pit height, which corresponds to the product of a physical pit height and the refractive index of the substrate of the optical disk. The pits are modulated by the recorded information. For example, the lengths of the pits are modulated by the recorded information. When, the light beam is projected onto center lines of two adjacent turns of the track so as to form the light spot covering the two adjacent tracks, the light beam, which is diffracted and reflected by the information pits on both of the two adjacent tracks is received by the photodetector, which has the light receiving surface divided into two i.e. left and right light receiving surfaces segmented with respect to a segment line extending parallel with respect to the circular direction of the optical disk. When the light beam is projected onto the center lines of the two adjacent tracks, the light beam from the light spot is incident to a center portion of the entire light receiving surface of the photodetector. Information is read from one of the two adjacent tracks as follows. Assuming that either the left light receiving surface or the right light receiving surface is segmented into two areas arranged forward and backward with respect to the circular direction, that is, a forward light receiving area and a backward light receiving area, a first light detection signal S1 obtained from the forward light receiving area is expressed as follows:

$$S1 = a + b \times cos(2\pi vt + \phi_1) \qquad (4)$$

where a is a constant related to a DC component contained in the light detection signal S1, b denotes a first constant related to a frequency component thereof, v is a second constant related to the frequency component thereof, $\phi_1$ denotes a first constant related to a phase difference, and t denotes a variable indicating time. Further, a second light detection signal S2 obtained from the backward light receiving area is expressed as follows:

$$S2 = a + b \times cos(2\pi vt + \phi_2) \qquad (5)$$

where $\phi_2$ denotes a second constant related to a phase difference. In this case, the values of the numerical aperture, the wavelength, the track pitch, and the parameters of the pit such as a pit width, an optical pit height and a pit length, are determined so that the following expression stands:

$$cos\{(\phi_1 - \phi_2)/2\} = 0 \qquad (6).$$

According to the present invention, the above mentioned object can be also achieved by an optical disk reproducing apparatus for reproducing the information from an optical disk. The optical disk reproducing apparatus is provided with: a light projection device for projecting a light beam of a predetermined wavelength to form a light spot, on an optical disk, which includes a disk-shaped information recording member having an information recording surface, a track formed on the information recording surface, and a plurality of pits arranged on the track and modulated by information recorded on the information recording surface; a photodetector device having a two divided light receiving surfaces with a segment line extending parallel with respect to a circular direction of the optical disk, the pits having predetermined parameters such that the light from the light spot formed on a center line of two adjacent turns of the track is detected to be a DC component signal by one of the two divided light receiving surfaces; an optical system for guiding the light from the light spot formed on the center line of the two adjacent turns of the track to a center portion of the two divided light receiving surfaces; a control device for controlling the light projecting device to project the light beam onto the center line of the two adjacent turns of the track; and an information reproducing device for reproducing the recorded information from the signal outputted from the other of the two divided light receiving surfaces.

In the operation of the optical disk reproducing apparatus of the present invention, the light projecting device projects the light beam onto the optical disk under the condition of the predetermined numerical aperture. At this time, the control device controls the light beam emitted from the light projecting device so that it is projected onto the center lines of two adjacent tracks. Then, the optical system guides the light from the light spot to the center portion of the light receiving surfaces of the photodetector. The photodetector receives the light from the light spot by the two divided light receiving surfaces i.e. left and right light receiving surfaces, and outputs electric signals from the left and right light receiving surfaces, respectively. An information reproducing device reproduces the information from the optical disk by performing an information conversion process that is the reverse of an information conversion process for recording information on the optical disk.

The output signal of the photodetector is the sum of the aforementioned first and second light detection signals S1 and S2 read from one of the two divided light receiving surfaces, and is expressed as follows:

$$\begin{aligned} S1 + S2 &= 2a + b \times \{cos(2\pi vt + \phi_1) + \\ & \quad cos(2\pi vt + \phi_2)\} \\ &= 2a + 2b \times \{cos\alpha \times (cos2\pi vt \times cos\beta - \\ & \quad sin2\pi vt \times sin\beta)\} \end{aligned} \qquad (7)$$

where:

$$\alpha = (\phi_1 - \phi_2)/2 \qquad (8)$$

$$\beta = (\phi_1 - \phi_2)/2 \qquad (9).$$

In the expression (4), the values of the numerical aperture, the wavelength, the track pitch, the track width, the optical pit height, and the pit length, are determined so that the following expression stands:

$$cos\alpha = cos\{(\phi_1 - \phi_2)/2\} = 0 \qquad (10).$$

In this case, the second term on the right side of the expression (7) is equal to zero, and hence the following is obtained:

$$S1 + S2 = 2a \qquad (11).$$

Thus, the sum of the detection signals S1 and S2 includes only a DC component, and hence the information is not read from the signal (S1+S2). It follows that pit information from one of the two adjacent turns of the track is not included in the sum signal obtained from one of the two light receiving surfaces of the photodetector, and pit information from the other turn of the track is not included in the sum signal obtained from the other light receiving surface. That is, even when the light beam is concurrently projected onto two adjacent turns of the track i.e. forms the light spot covering the two adjacent turns of the track, the information concerning only one of the two adjacent turns of the track can be read from one of the light receiving surfaces of the photodetector. As a result, the apparatus operates as if the light beam spot is projected onto only one turn of the track, and the track pitch value can be reduced to half of the currently available track pitch value.

In this manner, the track pitch value can be reduced without the necessity of reducing the wavelength of the light beam or increasing the numerical aperture of the optical system. That is to say, the track pitch of the optical disk can be reduced under the condition in which the currently available laser beam wavelength and the existing numerical aperture are used as they are. Further, if the wavelength is reduced or the numerical aperture is increased, a further reduced track pitch can be employed, according to the present invention.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

A description will now be given of an embodiment of the present invention.

Figure 5A:
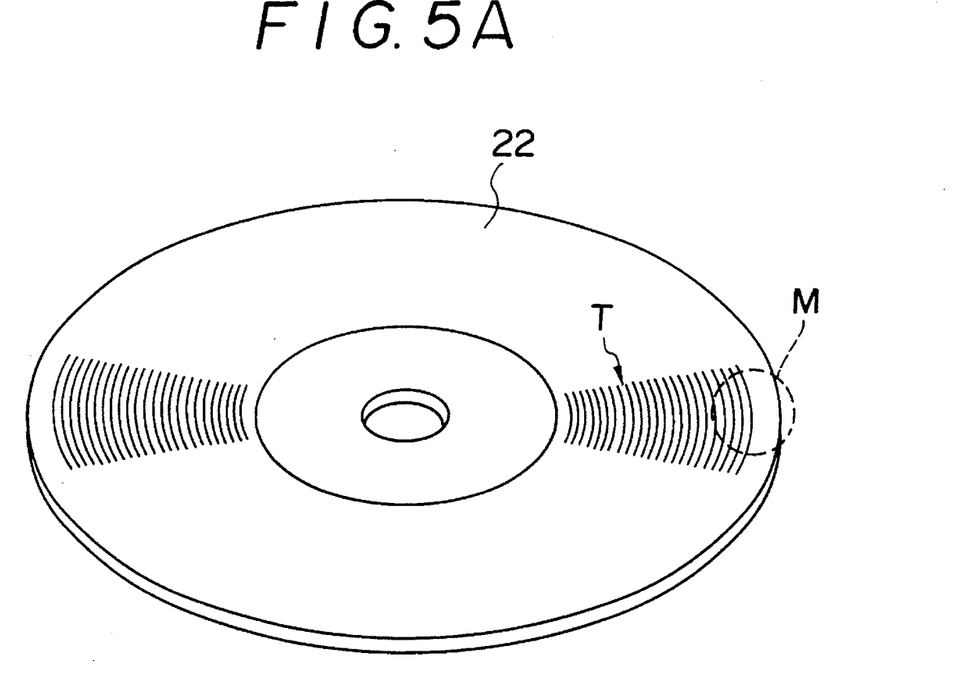
FIG. 5A is a perspective view of an optical disk according to a first embodiment of the present invention.
Figure 5B:
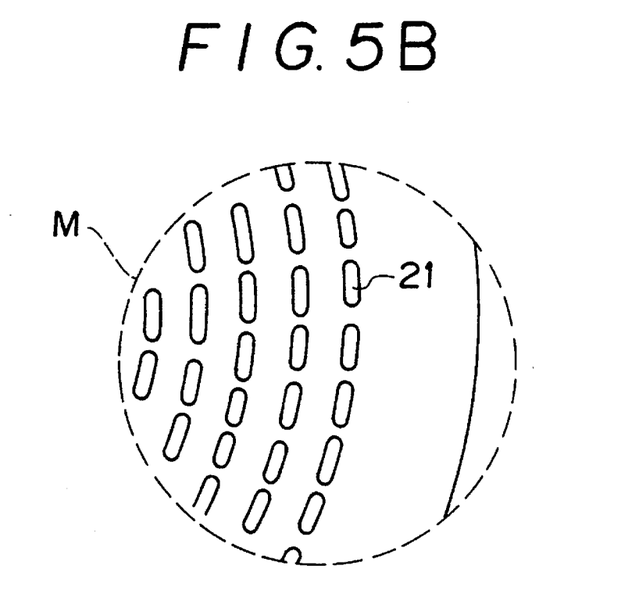
FIG. 5B is a plan view showing pits formed on the optical disk shown in FIG. 5A.

FIGS. 5A, 5B, 6A, 6B, 7, 8 and 9 show a first embodiment of the present invention which is a compact disk. FIG. 5A shows a compact disk 22, which has a track T spirally formed from an inner portion of the compact disk 22 to an outer portion thereof. FIG. 5B is an enlarged plan view of a portion M of the compact disk 22 shown in FIG. 5A. A reference number 21 indicates an information pit. The length of the pit is modulated by the information recorded on the optical disk, in the present embodiment. Alternatively, the reflection coefficient of the pit may be modulated by the recorded information.

Figure 6A:
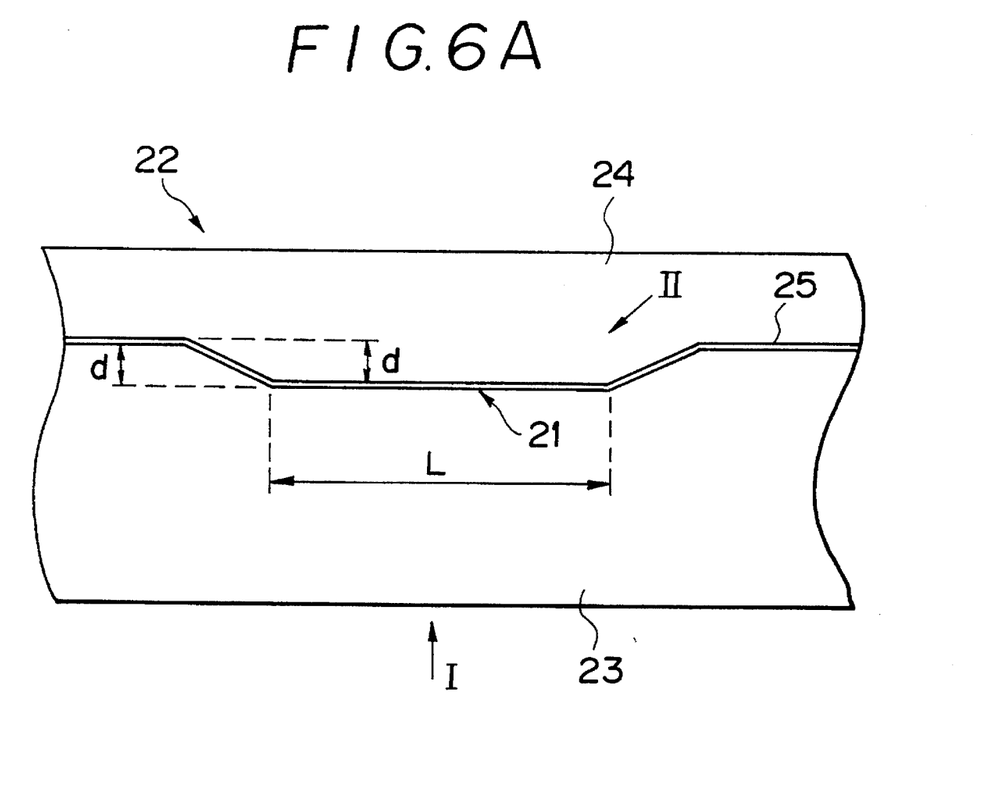
FIG. 6A is a cross-sectional view of the optical disk according to the present invention.
Figure 6B:
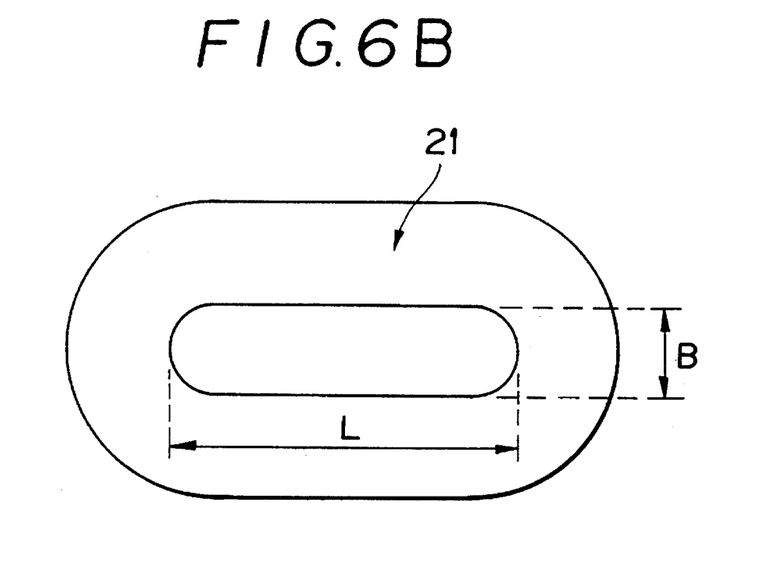
FIG. 6B is a diagram showing a pit used in the first embodiment of the present invention.

As shown in FIG. 6A that is a cross-sectional view of the compact disk 22, the compact disk 22 includes a protection layer 24, an information recording surface 25, and a substrate 23. The protection layer 24 has projections corresponding to pits. The information recording surface 25 is formed so that it covers the pits and other flat portions of the protection layer 24 by a metallic vapor-deposited film made of, for example, aluminum or the like. The information recording surface 25 is covered by the substrate 23 made of, for example, polycarbonate resin or the like having a refractive index n. The information pit 21 is a convex portion, facing downward, of the metallic vapor-deposited film. As shown in FIGS. 6A and 6B, the information pit 21 has a top portion having a length L, a width B, and a height d from a flat surface of the information recording surface 25. In this case, the optical height of the information pit is equal to n×d.

Figure 7:
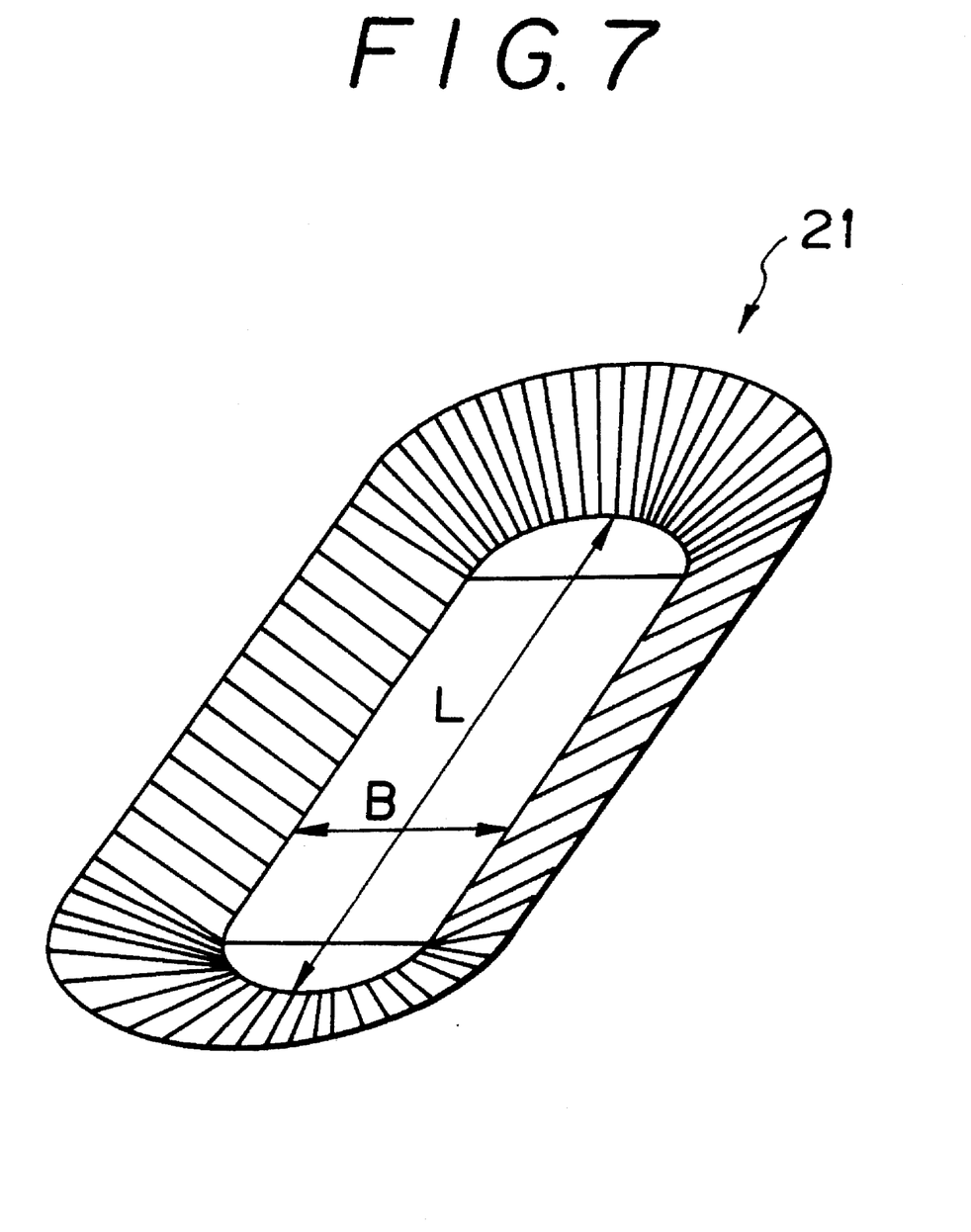
FIG. 7 is a perspective view of a pit used in the first embodiment of the present invention.

FIG. 7 is a perspective view of the information pit 21 taken in a direction II in FIG. 6A. From FIG. 7, it is clearly understood that the information pit 21 has a recess. The information pit 21 is read by projecting a laser beam onto the information pit 21 in a direction I shown in FIG. 6A. The information pit 21 serves as a convex with respect to the laser beam incident thereto.

Figure 8:
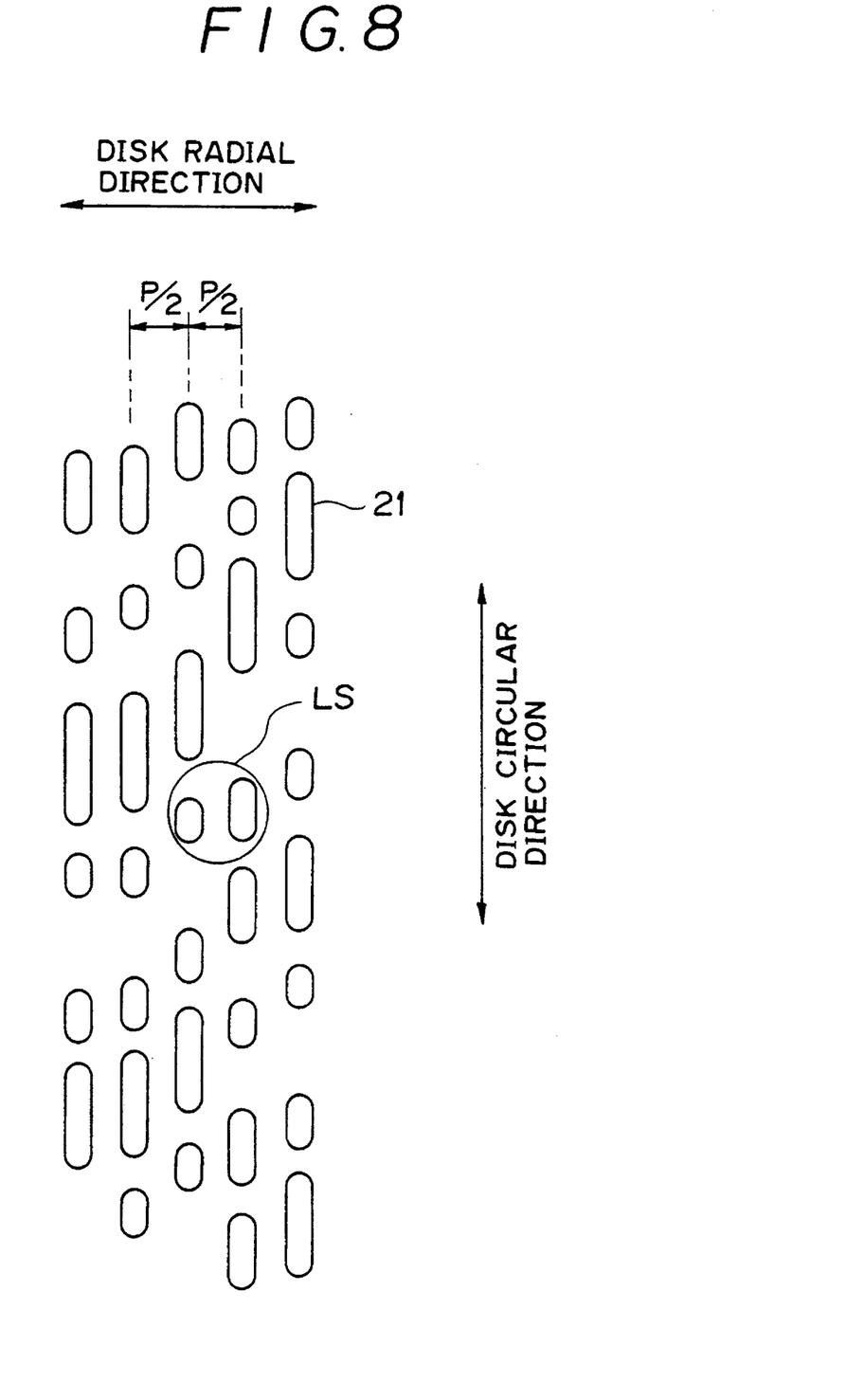
FIG. 8 is a diagram illustrating a track pitch of the optical disk of FIG. 5.

FIG. 8 shows a track pitch of the compact disk being considered. The track pitch of the compact disk of the present embodiment is equal to P/2, which is half of the currently available normal track pitch P prescribed by the size of the light spot LS as shown in FIG. 2.

In FIG. 8, suitable examples of the dimensions of the information pit 21 will be listed below.

Laser beam wavelength λ: 0.780 μm

Numerical aperture NA of objective lens: 0.45

Refractive index of the substrate: 1.55

Unit pit length 1T=0.30 μm

Pit width B: 0.4 μm

Track pitch (P/2): 0.80 μm

Pit height d: 0.076 μm

Optical pit height (n×d):0.118 μm=0.151×λ

The above dimensions of the information pit 12 are obtained as follows. Namely, the basic expression of a scaler theory regarding read signals of optical disks, proposed by H. H. Hopkins, is used (see H. H. Hopkins, "Diffraction theory of laser read-out systems for optical video discs", *Journal of the Optical Society of America*, Vol. 69, No. 1, January 1979, or "Optical disk systems", *The Institute of Applied Physics*, edited by the round-table conference, pp. 45–50). In the present embodiment, a laser beam spot is projected onto the center lines of two adjacent tracks so as to cover the pits on the two adjacent tracks, while the output signals of a photodetector having two divided light receiving surfaces are monitored. The photodetector is positioned so that the center of a spot of the laser beam reflected by the optical disk is incident to the center of the light receiving surface of the photodetector and that the segment line between the two light receiving surfaces extends in the circular direction on the optical disk. In this state, information is read from the optical disk, and the read signal is obtained from one of the two divided light receiving surfaces. In this case, the read signal S of one of the irradiated adjacent tracks from one of the light receiving surfaces is expressed as follows:

$$\begin{aligned} S &= S1 + S2 \\ &= 2a + b \times \cos\{(2\pi vt + \phi_1) + \cos(2\pi vt + \phi_2)\} \\ &= 2a + 2b \times \{\cos\alpha \times (\cos 2\pi vt \times \cos\beta - \sin 2\pi vt \times \sin\beta)\} \end{aligned} \quad (12)$$

The signal S1 is obtained from a half of one of the two divided light receiving surfaces of the photodetector (a quarter thereof), and the signal S2 is obtained from the other half thereof.

In the expression (12):

$$\alpha = (\phi_1 - \phi_2)/2 \quad (13)$$

$$\beta = (\phi_1 - \phi_2)/2 \quad (14).$$

In the expression (12), the values of the numerical aperture, the wavelength, the track pitch, the track width, the optical pit height (which corresponds to the product of the pit height and the refractive index of the substrate), and the pit length, are determined so that the following expression stands:

$$\cos\alpha = \cos\{(\phi_1 - \phi_2)/2\} = 0 \qquad (15).$$

Accordingly, the second term on the right side of the expression (12) becomes equal to zero, and hence the following expression is obtained:

$$S = S1 = S2 = 2a \qquad (16).$$

As a result, the read signal S of one of the irradiated adjacent tracks includes only the DC component $2a$, and hence information is not obtained from the read signal S of one of the irradiated adjacent tracks. It can be seen from the above that the read signal of the other of the irradiated adjacent tracks from one of the light receiving surfaces other than the read signal S of one of the irradiated adjacent tracks is not affected by crosstalk resulting from the read signal S of one of the irradiated adjacent tracks. That is, even when the laser beam spot is concurrently projected onto two tracks, only the information recorded on one of the two tracks can be read from one of the two divided light receiving surfaces and, in the same manner, only the information recorded on the other of the two tracks can be read from the other of the two divided light receiving surfaces. The above readout operation is carried out as if the laser beam spot would be projected onto only one track. Hence, it is possible to reduce the track pitch to half of the currently available track pitch value.

Out of the parameters regarding the information pit, the unit pit length 1T corresponds to bit lengths 3T to 11T used for an EFM (Eight to Fourteen Modulation) process for compact disks. Accordingly, the information pit length is 0.90 μm (=3×0.30 μm) for 3T, and 3.3 μm (=11×0.30 μm) for 11T.

Figure 9:
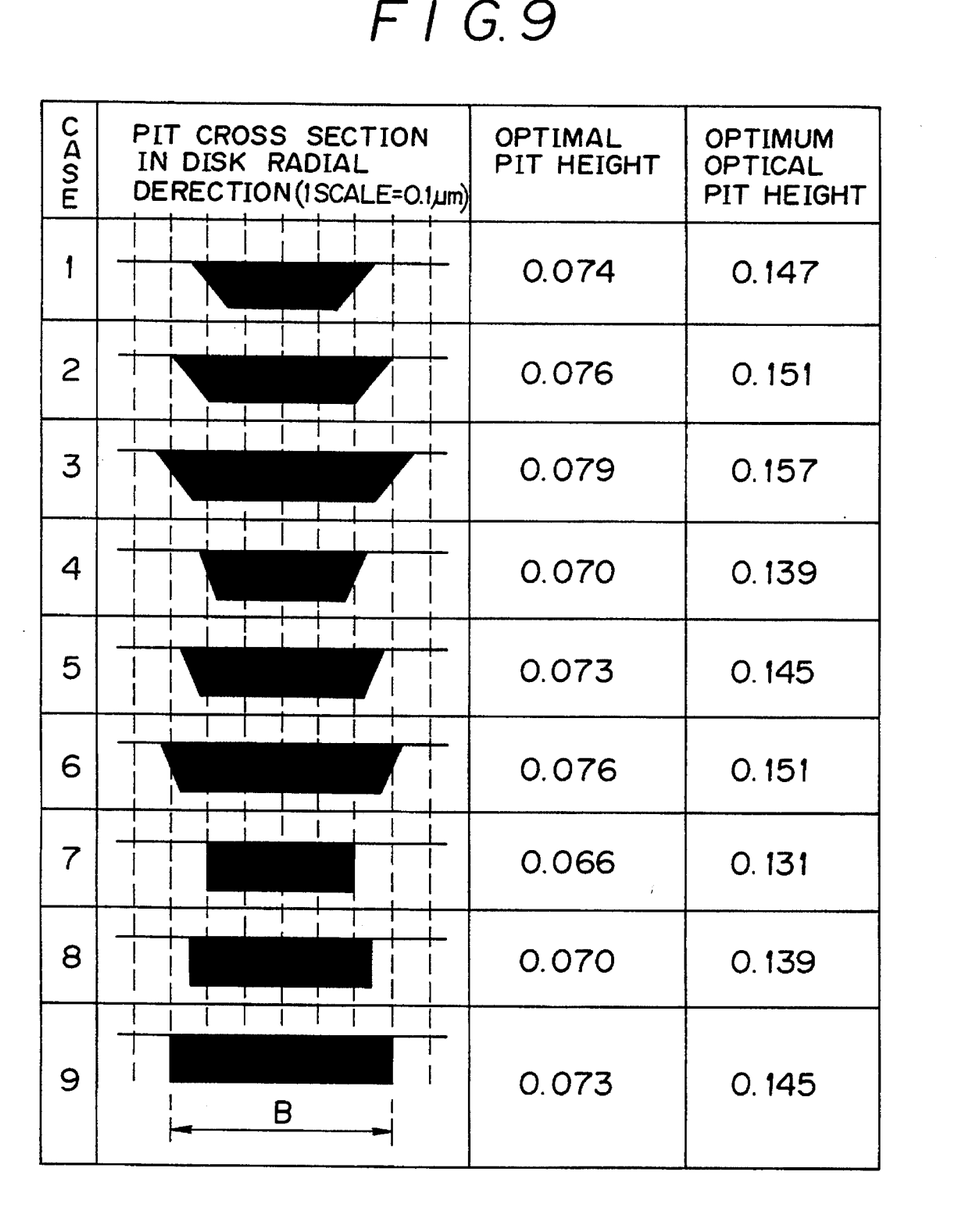
FIG. 9 is a diagram showing optimal pit heights in the first embodiment of the present invention.

FIG. 9 shows the optimal pit heights d and optimal optical pit heights n×d for various pit cross sections taken in the radial direction of the disk. The heights shown in FIG. 9 are computed by using the basic expression proposed by Hopkins. The optimal optical pit heights n×d are expressed as a function of the wavelength λ of the laser beam. The aforementioned optimal pit dimensions correspond to the case 2 shown in FIG. 9, in which the pit width B of the top portion of the pit is equal to 0.4 μm. In the case 2, $$n \times d = 0.151 \times \lambda \qquad (17).$$

By changing the numerical aperture NA and the wavelength λ of the laser beam, it is possible to select other optimal optical pit heights. For example, if the wavelength λ of laser becomes shorter than the current wavelength equal to 0.780 μm in the future, it will be still possible to determine the optimal optical pit height n×d by using the expression (17).

Assuming that the numerical aperture used in the future is written as NAo and the wavelength of laser is λo, a laser beam size $w_o$ (the diameter of the beam spot) which will be used in this case is as follows:

$$w_o = 1.22 \times (\lambda o / NAo) \qquad (18)$$

while the laser beam size for the case 2 in FIG.9, is equal to 2.1 μm (=0.78÷0.45×1.22). Further, the unit bit length (pit length per 1T) which will be used in this case is calculated as follows:

$$0.3 \times (\lambda o / NAo) \times (0.45/0.78) = 0.173 \times (\lambda o / NAo) \text{ (μm)} \qquad (19)$$

while the unit bit length for the case 2 in FIG.9, is 0.30 μm. Furthermore, the track pitch which will be used in this case is calculated as follows:

$$0.8 \times (\lambda o / NAo) \times (0.45/0.78) = (\lambda o / NAo) \text{ (μm)} \qquad (20)$$

while the track pitch for the case 2 is 0.8 μm.

In the above-mentioned manner, it is easy to obtain the optimum optical pit height and other pit dimensions in the present embodiment.

A description will now be given, with reference to FIG. 10, of a second embodiment of the present invention which is a compact disk player.

Figure 10:
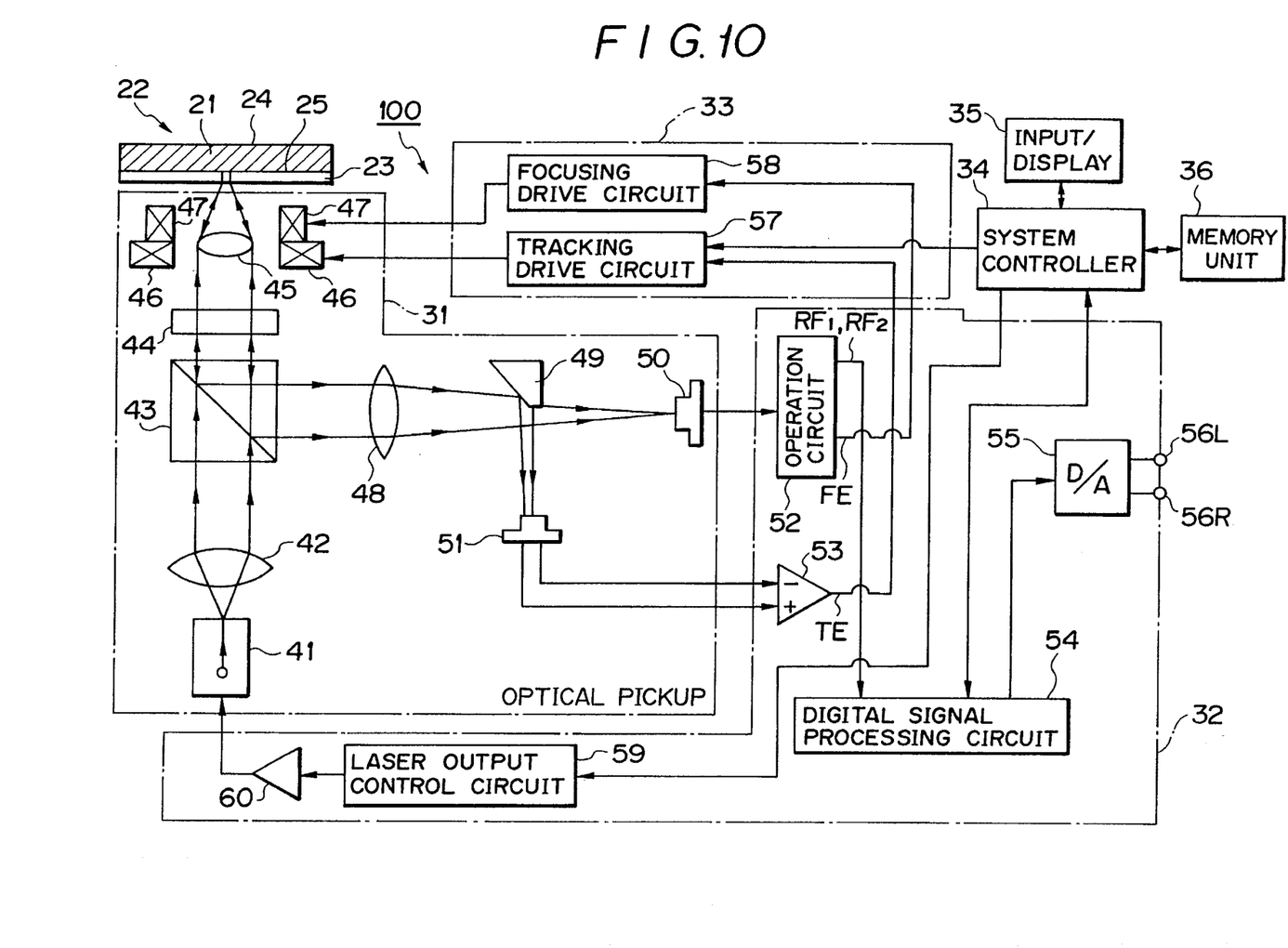
FIG. 10 is a block diagram of an optical disk reproducing apparatus according to a second embodiment of the present invention.

Referring to FIG. 10, a compact disk player 100 includes an optical pickup 31, a signal processing unit 32, a pickup control unit 33, a system controller 34, an input/display unit 35, and a memory unit 36. The optical pickup 31 reads information from the compact disk 22. The signal processing unit 32 processes readout information. The pickup control unit 33 controls the optical pickup 31. The system controller 34 controls the entire operation of the compact disk layer 100.

The optical pickup 31 includes a semiconductor laser 41, a collimator lens 42, a beam splitter 43, a quarter-wave plate 44, an objective lens 45, a convergent lens 48, a prism mirror 49, a four-divided photodetector 50, and a two-divided photodetector 51. The semiconductor laser 41 emits a laser beam. The collimator lens 42 collimates the laser beam emitted from the semiconductor laser 41. The beam splitter 43 allows the collimated laser beam to pass. The quarter-wave plate 44 introduces a phase difference to the collimated beam from the beam splitter 43. The objective lens 45 focuses the laser beam from the quarter-wave plate 44 on the information recording surface 25 of the compact disk 22. The laser beam is reflected by the reflection film of the information recording surface 25 and passes through the objective lens 45 and the quarter-wave plate 44. Then, the laser beam is reflected by a reflection surface of the beam splitter 43 so that the optical path is bent at a right angle. The convergent lens 48 converges the laser beam from the beam splitter 43. The prism mirror 49 guides the laser beam from the convergent lens 28 to the four-divided photodetector 50 and the two-divided photodetector 51. The four-divided photodetector 50 receives the laser beam from the prism mirror 49, and the two-divided photodetector 51 receives the laser beam from the prism mirror 49. As shown in FIG. 10, the laser beam is projected onto the compact disk 22 from the bottom side thereof.

The signal processing unit 32 includes an operation circuit 52, a subtracter 53, a digital signal processing circuit 54, a D/A converter 55, output terminals 56L and 56R, a laser output control circuit 59, and a semiconductor laser driving circuit 60. The operation circuit 52 receives output signals of the four-divided photodetector 50, and executes a predetermined operation on the output signals. The subtracter 53 receives output signals of the two-divided photodetectors 51, and generates, as a tracking error signal TE, a difference signal indicating the difference between the output signals. The digital signal processing circuit 54 receives one of the read signals RF1, RF2 outputted from the operation circuit 52, and demodulates the received signal into an information signal in digital form. The D/A converter 55 converts the digital signal from the digital signal processing circuit 54 into analog signals. The output terminals 56L and 56R are used for externally outputting the analog signals from the D/A converter 55. The semiconductor driving circuit 60 drives the semiconductor laser 41. The laser output control circuit 59 controls the semiconductor laser driving circuit 60.

The pickup control unit 33 includes a tracking drive circuit 57, and a focusing drive circuit 58. The tracking drive circuit 57 receives the tracking error signal TE outputted from the subtracter 53, and controls a tracking actuator 46 of the optical pickup 31 in accordance with the tracking error signal TE. The focusing drive circuit 58 controls a focusing actuator 47 of the optical pickup 31 on the basis of a focus error signal FE outputted from the operation circuit 52.

The system controller 34 controls, on the basis of instructions from the input/display unit 35 and other signals, the digital signal processing circuit 54, the tracking drive circuit 57 and the laser output control circuit 59. The system controller 34 transmits data to and receives data from the memory unit 36.

Figure 11:
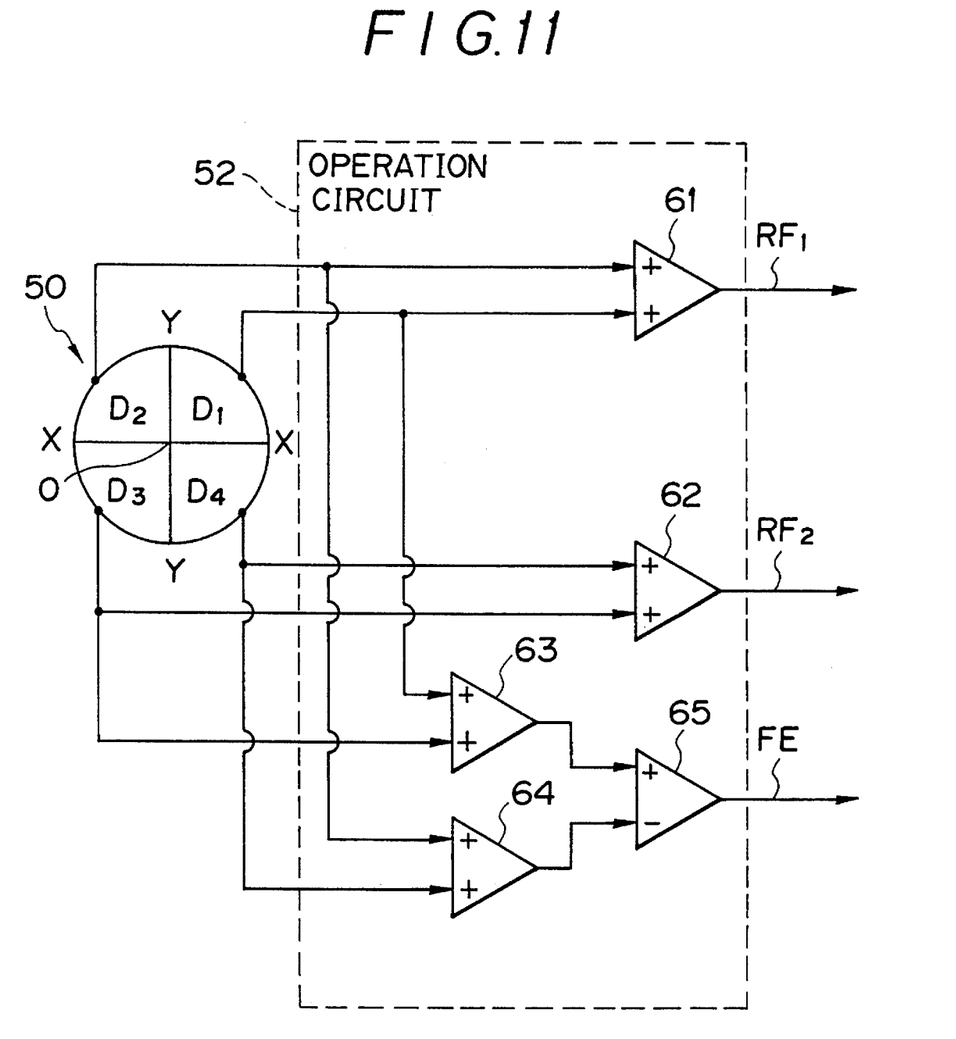
FIG. 11 is a block diagram showing a photodetector and an operation circuit shown in FIG. 10.

FIG. 11 shows the details of the four-divided photodetector 50 and the operation circuit 52. As shown in FIG. 11, the four-divided photodetector 51 includes four light receiving surfaces D1–D4. The operation circuit 52 includes four adders 61, 62, 63 and 64, and a subtracter 65, which are connected, as shown in FIG. 11. The adder 61 outputs a read signal RF1 from one (D1+D2) of the two divided light receiving surfaces of the four-divided photodetector 50, and the adder 62 outputs the read signal RF2 from the other light receiving surface (D3 and D4). The subtracter 65 outputs the above-mentioned focus error signal FE. A segment line X—X of the four-divided photodetector 50 extends parallel to the circular direction of the compact disk 22. The optical system shown in FIG. 10 is positioned so that when the center of a spot formed by the laser beam from the objective lens 45 is projected onto the center lines of the two adjacent tracks, the center of the spot is located on the center portion of the entire light receiving surface.

Either the read signal RF1 or RF2 of one of the irradiated adjacent tracks includes only a DC component, which does not affect the other signal by the crosstalk. Hence, by demodulating the other signal as it is, it is possible to reproduce information from the compact disk 22 without the disturbance of the crosstalk, since the DC component is not demodulated.

The present invention is not limited to the specifically disclosed embodiments, and the values of the laser beam wavelength, the numerical aperture, the refractive index of the substrate and the shape of information pits can be arbitrarily determined as long as the expressions (6), (10) and (15) are satisfied. The aforementioned embodiments of the present invention relate to compact disks, while the present invention includes other optical disks of pit formation type, such as LVDs. Information pits may be of convex or recess type.

According to the present embodiment, it is possible to reduce the track pitch value to half of the currently available pitch even under a condition in which the currently available laser beam wavelength and the currently available numerical aperture of objective lens are used. The track pitch will be further reduced in accordance with a future reduction in the spot size of laser beam resulting from change in the wavelength or numerical aperture. Hence, the recording density will be further enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disk reproducing apparatus comprising:

an optical disk;

a light projection means for projecting a light beam of a predetermined wavelength to form a light spot on said optical disk, which includes a disk-shaped information recording member having an information recording surface, a track formed on the information recording surface, and a plurality of pits arranged on the track and having a shape determined in accordance with information recorded on the information recording surface;

a photodetector means having two divided light receiving surfaces with a segment line extending parallel with respect to a circular direction of the optical disk, each of the pits having an optical pit height, a pit length and a pit width such that the light from one of two adjacent turns of the track irradiated by the light spot formed centered on a center line between the two adjacent turns of the track is detected to be a DC component signal containing no information from said one of the two adjacent turns of the track by one of the two divided light receiving surfaces, and to be an AC signal containing information from said one of the two adjacent turns of the track by the other of the two divided light receiving surfaces, and such that the light from the other of the two adjacent turns of the track irradiated by the light spot is detected to be an AC component signal containing information from the other of the two adjacent turns of the track by said one of the two divided light receiving surfaces, and to be a DC component signal containing no information from the other of the two adjacent turns of the track by the other of the two divided light receiving surfaces;

an optical system for guiding the light from the light spot formed on the center line of the two adjacent turns of the track to a center portion of the two divided light receiving surfaces;

a control means for controlling the light projection means to project the light beam centered onto the center line between the two adjacent turns of the track; and an information reproducing means for reproducing the recorded information from the AC signal outputted from the other of the two divided light receiving surfaces.

2. An optical disk reproducing apparatus according to claim 1, wherein a first light detection signal S1 defined below is obtained from one of forward and backward light receiving areas of either one of the two divided light receiving surfaces, arranged forward and backward with respect to the circular direction of the optical disk:

$$S1 = a + b \times \cos(2\pi v t + \phi_1)$$

where a is a constant related to a DC component contained in the signal S1, b denotes a first constant related to a frequency component thereof, v is a second constant related to the frequency component thereof, $\phi_1$ denotes a first constant related to a phase difference, and t denotes a variable indicating time, and a second light detection signal S2 defined below is obtained from the other of the forward and backward light receiving areas:

$$S2 = a + b \times cos(2\pi vt + \phi_2)$$

where $\phi_2$ denotes a second constant related to a phase difference, and wherein a numerical aperture of the optical system, the wavelength, a track pitch, and the parameters of the pits, are determined to satisfy the following expression:

$$cos\{(\phi_1 - \phi_2)/2\} = 0.$$

3. An optical disk reproducing apparatus according to claim 1, further comprising: a focusing drive means for driving said optical system to focus the light beam on said optical disk; and a tracking drive means for driving said optical system to make the light beam follow the track of said optical disk.

4. An optical disk reproducing apparatus according to claim 2, wherein said photodetector means comprises a four divided photodetector for obtaining the first and second light detection signals S1 and S2.

5. An optical disk reproducing apparatus according to claim 1, further comprising: a light separating means for separating a portion of the light from the light spot; and another photodetector means for receiving the separated portion of the light and outputting a track error signal.

* * * * *